Jan. 13, 1953  O. R. MAXSON  2,625,341
SINGLE-ACTION SPINNING REEL
Filed March 1, 1951
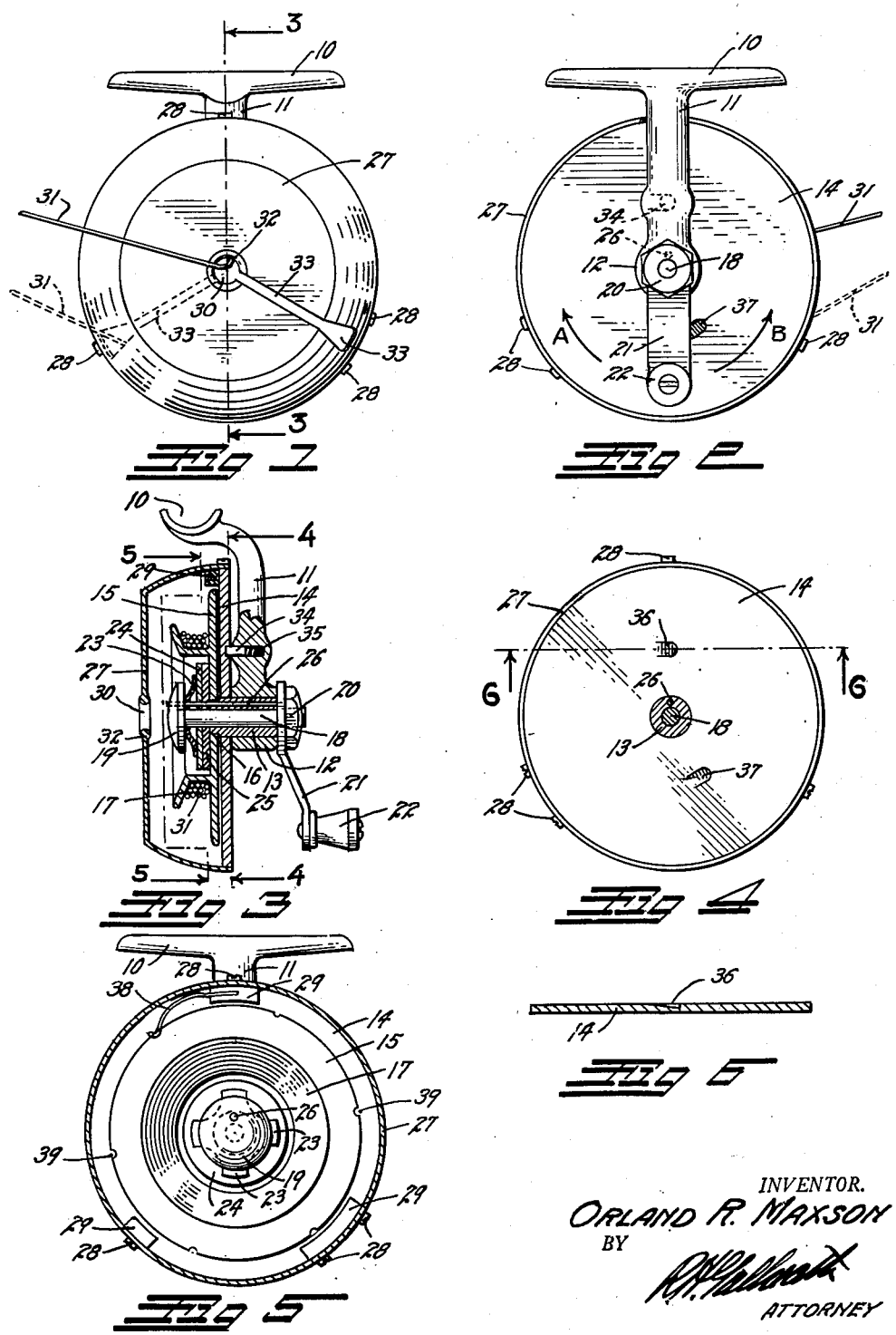
INVENTOR.
ORLAND R. MAXSON
BY
ATTORNEY Patented Jan. 13, 1953

2,625,341

UNITED STATES PATENT OFFICE 2,625,341

SINGLE-ACTION SPINNING REEL

Orland R. Maxson, Denver, Colo.

Application March 1, 1951, Serial No. 213,400

6 Claims. (Cl. 242—84.5)

This invention relates to a fishing reel, more particularly to the type of reel known as a "spinning" reel. The principal object of the invention is to provide a simple and highly efficient spinning reel construction in which the reel will be instantly brought either to the conventional line-retrieving position or to the spinning line-withdrawing position by the initial operation of the conventional reel winding crank without requiring any additional manual operations or mechanical movements of any kind.

Another object of the invention is to provide a simple and highly efficient fishing reel with a safety clutch construction which will release the reel from the crank in case of unusual obstructions to retrieving the line, and which will place a retarding or braking action upon the reel when the line is unreeled without use of the spinning feature.

A further object is to construct a spinning reel in which all external, movable, line-guiding members have been eliminated, and in which the reel itself will always remain in the same position relative to the pole.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a left side view of the improved reel;

Fig. 2 is a right side view thereof;

Fig. 3 is a vertical cross-section through the reel, taken on the line 3—3, Fig. 1;

Fig. 4 is a vertical, longitudinal section, taken on the line 4—4, Fig. 3;

Fig. 5 is a similar section, taken on the line 5—5, Fig. 3; and

Fig. 6 is a detail section through a backing plate employed on the improved reel, taken on the line 6—6, Fig. 4.

The improved reel is supported from a rod-engaging foot 10 arranged for attachment to the reel seat of a conventional fishing rod. A bracket arm 11 extends downwardly from the mid-portion of the foot 10 and terminates in an enlarged shaft bearing 12. A tubular shaft 13 is journalled in the bearing 12 and extends sidewardly therefrom through a circular backing plate 14 and into a circular spool plate 15.

The reel plate 15 rotatably rests against an annular shoulder 16 in the extremity of the tubular shaft 13. An annular line spool 17 is formed concentrically on, and projects from, the spool plate 15. Both the spool plate 15 and the backing plate 14 are freely rotatable on the tubular shaft 13. They are held in position on the shaft by means of an axial bolt 18, which extends through the tubular shaft 13 and terminates at the left extremity in an enlarged head 19 and at the other extremity in a retaining nut 20 which is threaded upon the bolt 18. The nut 20 clamps a hand crank 21 in place against the extremity of the tubular shaft 13. The hand crank terminates in any of the usual finger grip buttons 22.

The head 19 retains a resilient spring spider 23 against a clutch washer 24. The clutch washer 24 compresses a clutch disc 25 against the outer face of the spool plate 15. The clutch plate may be formed from fiber or any of the usual clutch plate materials which will provide good frictional contact with the reel plate 15 under the influence of the spring spider 23.

A key pin 26 extends eccentrically through aligned openings in the crank 21, the tubular shaft 13, the clutch washer 24, the spring spider 23, and the head 19 so that all of these elements must rotate simultaneously with the rotation of the crank 21. The key pin 26 does not engage the spool plate 15 or the backing plate 14.

A cup-like spool housing 27 extends about the backing plate 14 and covers the left side face of the reel mechanism. The housing 27 is secured in place on the spool plate 14 by means of suitable attachment screws 28, there being reinforcing blocks 29 secured or formed on the backing plate 14 to provide sufficient width for the screws 28.

The housing 27 is provided with an axially positioned line opening 30, through which the fishing line, indicated at 31, passes. The edge of the opening 30 is provided with a rounded, line-protecting bead 32. A line slot 33 extends radially from the opening 30 to a position adjacent the backing plate 14. The housing, with its radial slot 33, serves as a line guide member.

A ratchet dog 34 is mounted in the bracket arm 11 and is constantly urged against the rear face of the backing plate 14 by means of a suitable compression spring 35. The backing plate 14 is provided with two ratchet notches 36 and 37 in the path of the dog 34. The notch 36 is so positioned with reference to the dog 34 and the radial line slot 33 that it will engage the dog 34 at the termination of a rearward rotation of the backing plate 14, as indicated by the arrow B in Fig. 2, so as to stop the latter rotation when the line slot is in the solid line position of Fig. 1. The notch 37 is so positioned that it will engage the dog 34 and stop rotation of the backing plate 14 at the termination of a forward rotation thereof, as indicated by the arrow A, when the line slot 33 is in the broken line position of Fig. 1.

A click spring 38 is mounted in one of the blocks 29 and bears at its extremity against the periphery of the spool plate 15. The latter plate is provided with a plurality of spring-engaging notches 39 into which the extremity of the spring 38 releasably engages.

*Operation*

Let us assume that the reel is in the position of Figs. 1 and 2, and that it is desired to retrieve the line. The fisherman simply rotates the handle 21 in the direction of the arrow A of Fig. 2 to rotate the spool disc 15 forwardly. The friction of the click spring 38 and the resistance provided by the notches 39 causes the housing to rotate with the spool disc until the dog 34 engages in the ratchet notch 37. The line slot 33 has now been swung forwardly over the top of the spool axis to the broken line position of Fig. 1, to bring the line 31 to the outer extremity of the slot 33 in alignment with the line spool 17.

He now continues to rotate the handle 21 forwardly, and since the backing plate is held from further rotation by the dog 34, the click spring 38 will simply slide on the periphery of the spool disc, clicking over the notches 39 so that rotation will be imparted only to the spool 17 to wind the line thereon. The line can be played off the spool in the usual manner by simply drawing on the line, causing the spool 17 to rotate in a reverse direction. He can resist the withdrawing of the line by simply holding the handle 21 stationary, which will cause the clutch disc 24 to exert a braking action on the spool plate 15.

Now, should he desire to allow the line to spin from the spool, he simply rotates the handle 21 rearwardly, in the direction of the arrow B of Fig. 2. This causes the click spring 38 to swing the line slot 33 rearwardly across the top of the reel axis to the solid line position of Fig. 1, where it will be stopped by the dog 34 engaging the ratchet notch 36. This causes the line to be passed into the axial line opening 32, from which it may be withdrawn from the end of the spool 17, whipping or spinning about the latter.

The click spring 38 acts to resist unwinding movement of the reel 17 and to give warning that line is running out. It also serves to cause the backing plate 14 and the housing 27 to rotate in synchronism with the crank 21 between the limits of the ratchet notches 36 and 37.

While a specific form of the improvement has been illustrated and described herein, it is to be understood that the same may be varied, within the scope of the appended claims, without departing from the spirit of the invention.

Having thus described the invention, what is claimed and desired secured by Letters Patent is:

1. A fishing reel comprising: a reel-supporting bracket; a backing plate rotatably supported by said bracket; a line guide member attached to said backing plate, said line guide member having an axially positioned line opening with a line slot extending radially outward from the line opening to the periphery of said backing plate; a spool rotatably mounted between said backing plate and said line guide member; means for rotating said spool; means for causing said backing plate to rotate with the initial rotation of said spool in either direction; and means for stopping the rotation of said backing plate when the line guide slot has swung from a position at one side of the axis of said spool to a position at the other side thereof.

2. A fishing reel as described in claim 1 in which the means for stopping rotation of said backing plate comprises a spring-actuated ratchet dog carried by said bracket and engaging said backing plate, there being two ratchet notches in the latter plate positioned in the path of said dog to be engaged by the latter at the terminal of the rotation of said backing plate.

3. A fishing reel comprising: a line-winding spool; a backing plate rotatably mounted at one side of said spool; a housing supported from said backing plate and enclosing the other side of said spool, said housing having a line slot extending radially from an axial position at the latter side of said spool to a position in a plane transverse to the axis of said spool; a shaft extending from said spool through said backing plate; means for rotating said shaft; means for rotating said spool from said shaft; means for rotating said backing plate from said spool; and means for limiting the rotation of said backing plate to an arc which will allow said line slot to move to positions forward of and rearward of the axis of said spool.

4. A fishing reel comprising: a line-winding spool; a backing plate rotatably mounted at one side of said spool; a housing supported from said backing plate and enclosing the other side of said spool, said housing having a line slot extending radially from an axial position at the latter side of said spool to a position in a plane transverse to the axis of said spool; a shaft extending from said spool through said backing plate; means for rotating said shaft; means for rotating said spool from said shaft; means for rotating said backing plate from said spool; a stationary bearing bracket supporting said shaft; and a spring-actuated ratchet dog carried by said bracket and engaging said backing plate, there being ratchet notches in said backing plate to be engaged by said dog to limit the rotation of said backing plate to an arc which will allow said line slot to move to positions forward of and rearward of the axis of said spool.

5. A fishing reel comprising: a line-winding spool; a backing plate rotatably mounted at one side of said spool; a housing supported from said backing plate and enclosing the other side of said spool, said housing having a line slot extending radially from an axial position at the latter side of said spool to a position in a plane transverse to the axis of said spool; a shaft extending from said spool through said backing plate; means for rotating said shaft; a friction clutch device positioned between said shaft and said spool and transmitting rotation from said shaft to said spool; means for rotating said backing plate from said spool; and means for limiting the rotation of said backing plate to an arc which will allow said line slot to move forwardly and rearwardly of the axis of said spool.

6. A fishing reel comprising: a line-winding spool; a backing plate rotatably mounted at one side of said spool; a housing supported from said backing plate and enclosing the other side of said spool, said housing having a line slot extending radially from an axial position at the latter side of said spool to a position in a plane transverse to the axis of said spool; a shaft extending from said spool through said backing plate; means for rotating said shaft; means for rotating said spool from said shaft; a spring mounted on said backing plate and frictionally engaging said spool to impart rotation to said backing plate; and means for limiting the rotation of said backing plate to an arc which will allow said line slot to oscillate forwardly and rearwardly of the axis of said spool.

ORLAND R. MAXSON.

REFERENCES CITED

The following references are of record in the file of this patent:

UNITED STATES PATENTS

| Number | Name | Date |
|---|---|---|
| 1,033,296 | Auton | July 23, 1912 |
| 1,121,223 | Balch et al. | Dec. 15, 1914 |
| 2,569,770 | McFate | Oct. 2, 1951 |